Oct. 18, 1949.    W. J. BARRETT    2,485,350
METHOD OF CARBONATING LIME AND OF SEPARATING
THE SAME FROM MAGNESIA
Filed Dec. 4, 1943
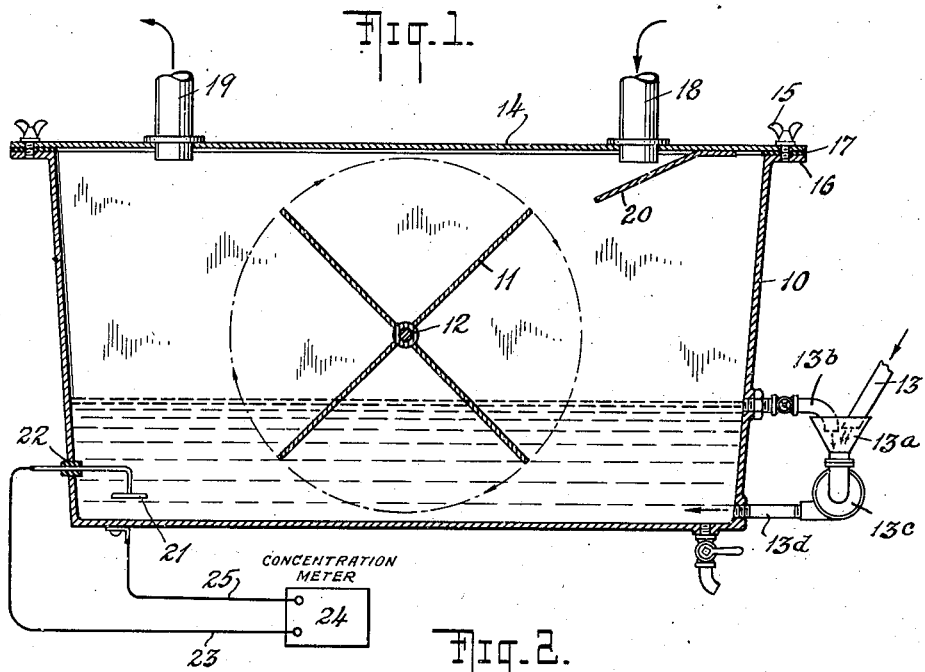
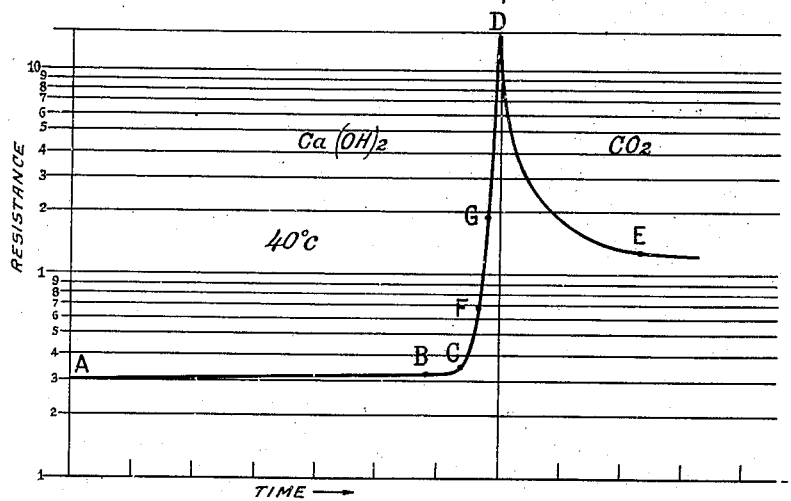
INVENTOR
WILLIAM J. BARRETT
BY
ATTORNEYS Patented Oct. 18, 1949

2,485,350

UNITED STATES PATENT OFFICE 2,485,350

METHOD OF CARBONATING LIME AND OF SEPARATING THE SAME FROM MAGNESIA

William J. Barrett, Adams, Mass., assignor to New England Lime Company, Adams, Mass., a corporation of Massachusetts Application December 4, 1943, Serial No. 512,912

14 Claims. (Cl. 23—66)

The present invention relates to the carbonation of lime and to the separation of lime from magnesia on a commercial scale in the case of mixtures thereof, as in various dolomitic limes, and to the production of a precipitated calcium carbonate having novel physical properties.

The invention has for one of its objects to provide a cheap process for the production of a precipitated calcium carbonate distinguished by an unusually pronounced free-flowing character, making it particularly useful for purposes requiring a non-agglomerating carbonate, as in the manufacture of tooth powder.

Another object of the invention is to eliminate the heretofore necessary step of hydrating the calcium oxide or dolomitic lime prior to the carbonation, thereby avoiding a troublesome operation involving the pumping of large volumes of water.

A further object of the invention is to provide a method of carbonating quicklime and dolomitic quicklimes which is independent of the method of slaking of the lime, i. e. whether with an excess of water to avoid high temperatures and to yield rapidly settling lime or with a minimum quantity of water, and in fact to eliminate completely the preliminary treatment of the quicklime with water.

A further object of the invention is to provide an improved procedure for the carbonation of lime wherein the character of the system in which the carbonate crystallizes can be closely controlled.

Still another object of the invention is to effect precipitation of rather large crystals of calcium carbonate without the aid of greatly elevated temperatures by the use of very small proportions of a base which is or forms a water-soluble carbonate.

It is also an object of the invention to devise a simple and inexpensive procedure for efficiently separating calcium from magnesium on a commercial scale in mixtures containing high proportions of calcium oxide and magnesia, preferably of the order of equimolecular proportions, as in the case of true dolomitic limes.

Other objects and advantages of the invention will appear from the following detailed description of the invention.

In prior methods of carbonating lime, the lime is slaked with the proper amount of water to produce a lime milk or slurry. For producing a more colloidal carbonate, less water and more stirring would be employed; while for producing a lime milk which would yield a more rapidly settling lime, an excess of water would be used whereby high temperatures would be avoided, the higher temperature and higher dispersion yielding greater body and greater shear between the particles. The lime milk was also produced by suspending previously hydrated lime in water. This procedure was, however, extremely troublesome and power-consuming; for the slaking of the lime is a rather messy operation; in addition, large volumes of water had to be used which required handling, pumping, etc.

According to the present invention, the preliminary slaking of the lime, whether in the form of calcium oxide or of a mixture of calcium and magnesium oxides, is completely eliminated. Instead of feeding the lime in the form of a milk comprising a saturated solution of the slaked lime with a large excess of undissolved calcium hydroxide, to the carbonating tank or chamber, I feed the quicklime in the form of a solid powder, and without previous treatment with water, that is, in the unslaked condition, into the reaction chamber. In the latter, the slaking and carbonation take place substantially simultaneously. The feed of the granular or pulverized quicklime takes place substantially continuously while simultaneously admitting carbon dioxide. The rate of feed of the quicklime with reference to the carbon dioxide, or vice versa, is so regulated as to cause the water in the reaction chamber to be continuously less than saturated with hydrated lime; that is, the amount of dissolved calcium hydroxide is maintained within the unsaturated range. By this procedure, the formation of solid suspended calcium hydroxide is prevented so far as possible. In consequence, the formation of the soft flocculent type of calcium carbonate particles, characteristic of the carbonation of calcium hydroxide suspensions, is minimized, and the resulting calcium carbonate is of remarkably uniform crystalline condition. This uniformity is such that the dried product is free-flowing.

By slaking the quicklime in the water used at the same time for producing the calcium carbonate suspension, I eliminate the considerable amount of handling of the large volumes of calcium hydroxide suspension heretofore used, and can also obtain a more highly concentrated calcium carbonate suspension than heretofore (higher than corresponds to the maximum concentration of lime slurry which it is convenient to handle), and thereby save considerably in equipment and power. Also, the heat liberated during the slaking of the lime in the carbonating chamber can be utilized to maintain the carbonating reaction at a desirably elevated temperature. The utilization of this heat is highly advantageous because by conducting the carbonation at different temperatures, I can control the crystalline nature of the precipitated calcium carbonate. Thus, where the carbonate reaction is conducted at temperatures below about 75° C., the resulting crystals are substantially all calcite; whereas, if the reaction is run above 75° C., and at or near the boiling point of water, the bulk of the crystals are in the form of aragonite. As the aragonite crystals are of needle (monoclinic) form and tend to mat, the precipitated aragonite is useful for insulating and similar purposes requiring a continuous and coherent body of calcium carbonate crystals.

My improved process affords the further advantage that the calcium carbonate obtained is rapid-settling; and when dry, is characterized by freedom from tendency to agglomeration, i. e., is free-flowing, so that it is exceptionally suited for the manufacture of tooth-powder and other products requiring a free-flowing neutral powder base. In my process it is immaterial what the original condition of the mineral carbonate was from which the lime was obtained, i. e., whether it was calcite, amorphous, or oolitic. I prefer to employ a lightly burned lime, as this is more reactive than an overburned lime.

When the reaction is run at a temperature of about 50° C., the crystals tend for the most part to be about 2 to 3 microns in diameter, but they are rapidly settling even at this size. However, I have found that by adding extremely small amounts of the carbonate, hydroxide or bicarbonate of an alkali metal, such as sodium or potassium, to the water in the reaction chamber, the average size of the crystals produced will be increased to about 10 to 12 microns, and even as high as 20 microns. This rather pronounced crystal size-increasing effect of extremely small amounts of the alkali metal compound, which may be of the order of 0.005% of the weight of the water, I attribute to the fact that since the water is maintained substantially less than saturated with lime, and the lime having a low order of solubility, the actual ratio of alkali metal ions to calcium ions is relatively large. Since the lime acts to convert the carbonate or bicarbonate of the alkali metal to the hydroxide, it makes no practical difference which basic compound is used.

My explanation for the action of the alkali metal compound, although it is to be understood that I am not committed thereto, is that the alkali metal hydroxide in all probability absorbs the carbon dioxide and then reacts with the lime. This view is supported by the fact that the alkali metal hydroxide is a stronger base than calcium hydroxide and reacts more quickly with the carbon dioxide. Since the water in the reaction chamber is maintained continuously less than saturated with lime, any calcium hydroxide formed by the reaction of the quick-lime with water is immediately reacted with the alkali metal carbonate. The degree of saturation of water with lime is most easily determined by measurement of the electrical conductivity of the liquid, as described in the United States patents to Stump, Nos. 2,198,640 and 2,231,965, over whose process the present invention is an improvement.

The use of the alkali metal base improves the free-flowing characteristics of the precipitated calcium carbonate, not only when the lime is charged into the reaction chamber in the dry condition, as in the present process, but also in the processes described in the above Stump patents, wherein the lime is fed in the form of an aqueous suspension in which the liquid phase is saturated with calcium hydroxide. The amount of alkali metal base used in the case of dolomitic quicklime is about the same as that for ordinary quicklime. The extremely small amounts of alkali metal base employed does not cause appreciable flocculation of the suspended magnesium oxide or hydroxide probably because of the presence of calcium hydroxide which acts as a protective agent for the magnesium compound.

In the separation of calcium from magnesium, as in the treatment of a dolomitic quicklime, it is desirable to produce a calcium carbonate which is crystalline and fast-setting, while leaving the magnesia content of the dolomitic lime in its original form. With the dry feed type of carbonation, the fast-settling crystalline calcium carbonate is immediately produced. In this process, however, it is important that the iso-electric point be not passed, as the excess carbon dioxide will render the magnesia fast-settling and thereby make a separation based on differences in settling characteristics extremely difficult, if not impossible.

Where ordinary quicklime (CaO) is treated by my process, there is obtained a calcium carbonate precipitate which is about 99% pure, the remainder being essentially all magnesium hydroxide and/or carbonate. This degree of purity is considerably higher than that found in nature for calcium carbonate. The calcium carbonate precipitate can be composed substantially completely of aragonite crystals by control of the temperature, as above explained. This mass of aragonite crystals of about 99% purity represents an entirely new composition; for if natural aragonite is purified, the crystalline structure is destroyed. So far as I am aware, no other commercial synthetic or purification process will yield aragonite of this degree of purity. Because the monoclinic crystals tend to mat, they form an efficient insulating medium and the highly pure crystal mass obtained by my process is excellently suited for such use.

I prefer so to conduct the process in the case of dolomitic quicklimes that the calcium is precipitated as calcite, since the latter settles more rapidly than aragonite, or at least does not tend to carry down with it any substantial quantity of magnesium. There can be obtained an $$Mg(OH)_2\text{-}MgO$$

fraction with less than 2% of calcium carbonate; while the calcium carbonate precipitate will carry with it less than 6% of magnesium compounds. These percentages are calculated on an oxide basis with an ignited sample.

My process can be carried out either by batch or continuously, the batch process being, however, generally preferred. When the process is carried out continuously, the suspension being withdrawn from the carbonating chamber as rapidly as water is fed into the chamber, the withdrawn suspension will contain about one-tenth of one per cent of unchanged calcium hydroxide. This will always be the case where the process is employed to separate calcium from magnesium, as in such separation it is not desirable to feed an excess of carbon dioxide, i. e., to pass the iso-electric point, for then precipitation of magnesium carbonate is promoted. However, where the process is employed to carbonate ordinary quicklime, the iso-electric point may be exceeded without materially affecting the physical properties of the precipitate. It may be mentioned that when the effluent contains about one-tenth of one per cent of calcium hydroxide, the amount that is retained in the ultimate dried product is only about one-tenth of this amount, i. e., one hundredth of one per cent, since only about one-tenth of the water remains with the deposit on the filter. This quantity of free calcium hydroxide is not detrimental; in fact, tests with certain commercial calcium carbonates have indicated an even higher proportion of free hydroxide.

In operating on the batch basis, the carbonating chamber is filled with water, and the dry lime (quicklime or dolomitic quicklime) and carbon dioxide, in the proper combining proportions, are simultaneously charged into the chamber, and the process is continued until the desired concentration of calcium carbonate is built up. Experience with the process has indicated that the crystals will remain uniform in size throughout the reaction. The maximum concentration to be built up is determined by the purely mechanical considerations of handling, screening, etc. Thus the carbonation may be continued until the water contains about 30 per cent solids. This mixture is still very mobile, because the crystals have little "body," as they are discrete particles. In the case of a colloidal or flocculated material, 15 per cent is about the upper limit of solids for convenient handling.

The feed of dry unslaked lime in accordance with the present invention can be applied in general to the process for the separation of calcium and magnesium, or for the carbonation of quicklime alone, described in the patents to Horace E. Stump, Nos. 2,198,640 and 2,231,965. By my modification of this known process, a crystalline calcium carbonate of superior physical properties is obtained.

A convenient procedure for charging the dry lime into the carbonating chamber is to withdraw part of the water in the chamber and employ it as a vehicle for the lime, the dry oxide being suspended in such water more or less in the immediate vicinity of the chamber, and the slurry thus produced is pumped back into the chamber.

The invention will be further described by reference to the accompanying drawing which is similar in several respects to that shown in the above-mentioned Stump patents. In said drawing, Fig. 1 shows diagrammatically a carbonation chamber having associated therewith a device for charging thereinto solid quicklime or dolomitic quicklime in accordance with the invention; and Fig. 2 shows a time-resistance curve of the batch carbonation of a suspension of calcium hydroxide at 40° C.

As was mentioned hereinabove, the carbonation of the calcium oxide is preferably conducted, and in the case of unslaked dolomitic lime it should be conducted, when the concentration of dissolved calcium hydroxide is in the unsaturated range; that is, the feed of the oxide or oxide mixture and the feed of carbon dioxide are so adjusted that the aqueous phase does not become saturated with calcium hydroxide. The control of the relative feeds is accomplished, for example, by determining the resistance of the aqueous suspension, it being obvious that the resistance will decrease as saturation is approached, and will increase toward the iso-electric point, i. e., as the concentration of calcium hydroxide approaches zero.

The characteristics of the curve shown in Fig. 2 are described in detail in the above-mentioned Stump patents, and will be here briefly described in the following:

The curve shows the change in the resistance of an aqueous suspension of calcium hydroxide containing floating solid particles of hydroxide, the suspension being originally saturated in the liquid phase, and the carbonation proceeding by the batch method, that is, used-up hydroxide is not replenished. The abscissae represent time and also the total amount of calcium hydroxide (solid and liquid phases). As the carbonation proceeds, the resistance of the solution phase remains approximately constant from the point A to the point B. This is due to the fact that as dissolved calcium hydroxide continues to be precipitated in the form of carbonate, it is continuously replaced by the solution of the solid hydroxide. At the point B, the suspended solid hydroxide is exhausted, and from then on the concentration of the liquid phase continuously falls and the resistance increases. As the carbonation proceeds with the accompanying fall of concentration, the resistance begins to increase more rapidly to the point C, and from such point it rises still more rapidly until the point D is reached, which theoretically corresponds to a zero concentration of calcium hydroxide and to the solubility of calcium carbonate, and of other substances present. This point D may be termed the iso-electric point. If the carbonation is continued, the resistance falls quite rapidly to approximately the point E from which point on it remains practically constant. This fall in resistance from D to E is probably due to the formation of calcium bicarbonate.

The interval from B to D represents the range of unsaturation of the calcium hydroxide solution; and in accordance with the preferred mode of carrying out the present invention, the carbonation of the calcium hydroxide is conducted continuously and the relative feeds of dry lime and of carbon dioxide are so controlled that the concentration of the calcium hydroxide is maintained within such range of unsaturation. To facilitate detection of a departure from the unsaturated range B—D either into the saturated range A—B or into the CO₂ (bicarbonate) range D—E, it is best to maintain the concentration within approximately the range F—G, corresponding to a concentration of approximately 10 to 15 per cent of saturation. Thereby small changes in concentration will be readily ascertainable in view of the rapid rate of change of resistance with respect to change in concentration at such strengths. However, somewhat higher or lower concentrations than the 10 to 15 per cent range may be employed. The curve shown in Fig. 2 does not, of course, represent the conditions actually existing either in my process or in the Stump process, and shows only the calcium hydroxide concentration for any found resistance. The actual conditions, once the process is stabilized, fall approximately within the range F—G.

The apparatus shown schematically in Fig. 1 comprises a tank 10 of stainless steel or any other suitable material which is provided with a suitable agitator, shown diagrammatically in the form of a paddle wheel 11 mounted upon a shaft 12 suitably journalled within the tank and rotating at the speed of about 400 R. P. M. The solid oxide (calcitic or dolomitic quicklime) is fed in any suitable manner into the reaction chamber, and may be either blown or dropped into the chamber, or charged thereinto in the form of a heavy suspension in water by the apparatus shown at the right of Fig. 1. Such apparatus includes a pipe 13 which feeds the oxide into a hopper 13a into which there debouches an overflow pipe 13b which charges water from the reaction chamber. This water acts as a carrier for the oxide and with the latter is sucked into a centrifugal pump 13c which discharges the mixture by way of a pipe 13d into the reaction chamber. The time during which the oxide is in contact with the water outside of the chamber is so extremely short that no appreciable proportion of the lime is slaked before it reaches the reaction vessel.

A cover plate 14 is detachably secured as by means of threaded studs and wing nuts, as shown at 15, the tank being provided with a horizontal flange 16, a gasket 17 being interposed between the cover and flange to insure gastightness. The carbon dioxide inlet is shown at 18 and the gas outlet at 19. A baffle plate 20 may be employed to direct the carbon dioxide upon the rotating paddle wheel. The carbon dioxide may be obtained by burning of calcite or dolomite, or may be composed of flue gases or any other gas rich in carbon dioxide.

For maintaining the solution of calcium hydroxide at the selected degree of unsaturation, there may be employed the mechanism shown in the Stump patents. This includes an electrode 21 which passes through a suitably insulated stuffing box 22, and is connected by conductor 23 with a device 24 for measuring concentration, as by way of conductivity, resistance, pH concentratiton, or any other suitable manner. Where the tank is made of metal, it may form the other electrode and can be connected by a conductor 25 to the measuring device. If the tank is made of non-conducting material, two electrodes 21 will be employed and will be separated at a suitable distance from each other. As the present invention does not relate to the mechanism for maintaining the solution phase at the selected concentration with respect to calcium hydroxide, it will not be further described.

In conducting my process on the "batch" basis, a suitable amount of water is charged into the chamber. If an alkali metal base is to be employed in order to promote the formation of larger crystals, the measured amount (about 0.005% by weight) is added to the water. After the agitator has been started, the feed of carbon dioxide and a dry quicklime or dolomitic quicklime is begun, the relative feeds being adjusted to maintain the reaction conditions within the range F—G indicated in Fig. 2. The process is continued until the amount of solids is about 30%, whereupon the feed of reacting materials is stopped. The calcium carbonate crystals are then allowed to settle either in the tank 10 or in a special settling tank into which the suspension is charged. The calcium oxide or dolomitic quicklime should be in the more or less pulverized condition, a 6-mesh fineness being satisfactory but a somewhat finer condition being preferred.

It will be understood that in the "batch" process above described, it is only the quantity of water that is really fixed, the quantity of reacting materials that is fed thereinto being governed by the ultimate concentration of precipitated chalk desired.

The carbon dioxide gas may be fed under the impeller at about an 8-foot head. It will be understood that the rate of food of the unslaked lime will be adjusted to the richness and rate of feed of the gas. The feed of the unslaked lime is controlled also in accordance with the conductivity readings to insure that the reaction is conducted under such conditions that the solution phase is unsaturated with respect to calcium hydroxide. After the process has been stabilized, the reactions appear to be of such nature that no considerable amount of solid calcium hydroxide remains suspended in the water; i. e., the speed of reaction and the relative feeds are such that the slaked lime immediately goes into solution to provide the unsaturated solution of calcium hydroxide, so that practically no excess slaked lime being present in solid, undissolved form. These conditions promote the formation of larger chalk crystals, and in the case of the carbonation of a dolomitic lime, they favor a better separation of calcium from magnesium.

The body of water at the beginning of the process is preferably at a temperature of 20 to 40° C., and the reaction chamber may be cooled if the process is to be conducted at a lower temperature range. The heat of reaction of calcium oxide with water and of calcium hydroxide with carbon dioxide is usually sufficient to take care of radiation losses where the process is conducted at a higher temperature range. As already indicated, at the higher temperature ranges, the production of aragonite crystals is favored; at a medium temperature of 75–90° C. the crytals are composed of approximately 80% aragonite and about 20% calcite, the latter being rhombahedral. The aragonite crystals will not change into calcite unless heated in the dry condition to an elevated temperature. Where the process is conducted at approximately 100° C., external heating will usually be required, yielding about 99–100% aragonite.

Where an alkali metal compound in the form of a base, or of a compound capable of reacting with calcium hydroxide to form the alkaline metal hydroxide, is added to the water in which the reaction takes place, the iso-electric point will be lower than that indicated in Fig. 2, and will be approximately at the point G. The control will, therefore, take place approximately between the points C and G.

The amount of alkali metal compound may be increased to about 0.05%, based upon the weight of water. Amounts considerably above this upper limit are undesirable in the case of dolomitic quicklimes, as they contaminate the residual magnesia suspension.

In carrying out my process on a continuous basis, water is continuously fed into the reaction chamber along with the dry unslaked lime. All or part of this water may be used in place of the water charged by pipe 13b in the apparatus of Fig. 1 for charging the lime into the reaction chamber. It will be understood that the chamber will in such case be provided with an overflow for drawing off the suspension of calcium carbonate and magnesia at the same rate as the water is charged into the chamber, as described more in detail in the above-named patents. The further treatment of the magnesia suspension may be conducted as described in such patents. Where an alkali metal compound is to be employed in the continuous process, the same may be charged in the form of a solution into the reaction chamber; or it may be added to the water before the latter is charged into the chamber.

Where I speak hereinabove of a dolomitic lime, the same is to be understood as meaning a lime composed preponderantly of calcium and magnesium oxides, the oxides being present in approximately equimolecular proportions.

I claim:

1. Process for carbonating lime which comprises charging powdered quicklime in dry condition directly into an agitated and carbonated body of water to form a suspension of said lime therein, regulating the introduction of dilute carbon dioxide into said water suspension at such a rate as to maintain the conductivity of the said suspension above that at the isoelectric point at the temperature obtaining, but within the unsaturated range with respect to the concentration of dissolved calcium hydroxide, and maintaining the temperature of the water above room temperature but below the boiling point of water.

2. Process according to claim 1, wherein the temperature is maintained at approximately 50° C.

3. Process according to claim 2, wherein the water into which the lime and carbon dioxide are charged contains a small quantity of an alkali metal base.

4. Process according to claim 1, wherein the temperature is maintained near the boiling point during the carbonation.

5. Process for carbonating lime comprising continuously charging carbon dioxide into a carbonating chamber containing water, simultaneously withdrawing water from the chamber and suspending therein, in the immediate vicinity of the chamber, powdered quicklime, and substantially continuously recharging the water into the chamber with the quicklime suspended therein at such a rapid rate that the time of contact of the quicklime and water outside the chamber is so short that no substantial proportion of the quicklime is slaked before the quicklime enters the chamber and substantially all of such quicklime is charged into the chamber in solid, unslaked condition, and the quantity of any calcium hydroxide which becomes dissolved in the water being charged into the chamber being of a concentration in the unsaturated range, the carbon dioxide being charged into the tank at such a rate as to maintain the conductivity of the lime suspension above that at the isoelectric point at the temperature obtaining, and the water in the carbonating chamber being maintained at a temperature above room temperature, but below the boiling point of water.

6. The method of separating magnesia from a calcium-magnesium carbonate containing mineral that has been burned substantially completely to a mixture of calcium and magnesium oxides, which comprises pulverizing said oxides, feeding said pulverized oxides in dry condition directly into an agitated and carbonated body of water to form a suspension of said oxides therein, regulating the introduction of diluted carbon dioxide into said water suspension at such a rate as to maintain the conductivity of said suspension above that at the isoelectric point at the temperature obtaining, maintaining the temperature of said body of water during carbonation at between 20 and 90° C., and separating magnesia and magnesium hydroxide from the resulting calcium carbonate.

7. Process according to claim 6 wherein the body of water contains approximately 0.005% to 0.05% by weight of an alkali metal base.

8. The method of separating magnesia from a calcium-magnesium carbonate containing mineral that has been burned substantially completely to a mixture of calcium and magnesium oxides, which comprises pulverizing said oxides, feeding said pulverized oxides in dry condition directly into an agitated and carbonated body of water to form a suspension of said oxides therein, regulating the introduction of diluted carbon dioxide into said water suspension at such a rate as to maintain the conductivity of said suspension above that at the isoelectric point at the temperature obtaining, maintaining the temperature of said body of water during carbonation below the boiling point of water but above room temperature, and separating magnesia and magnesium hydroxide from the resulting calcium carbonate.

9. The method of separating magnesia from dolomite that has been substantially completely converted into the oxides of calcium and magnesium, which comprises feeding said oxides in finely comminuted, dry form directly into an agitated and partially carbonated body of water to form a suspension having a maximum solids concentration of about 30%, regulating the introduction of diluted carbon dioxide into said suspension at such a rate as to maintain the conductivity thereof slightly above that at the isoelectric point at the temperature obtaining, maintaining said temperature below the boiling point of water but above room temperature, and separating magnesia and magnesium hydroxide from the resulting calcium carbonate.

10. The method of separating magnesia from dolomite which comprises calcining dolomite until it is substantially completely converted into the oxides of calcium and magnesium, comminuting said oxides, introducing said comminuted oxides in dry unslaked form into a body of water to form a water suspension of said oxides, passing into said suspension simultaneously with the slaking of said oxides, diluted carbon dioxide gas in sufficient amount and at a sufficient rate to maintain the conductivity of said suspension at a point above that at the isoelectric point at a temperature of about approximately 50° C., maintaining said temperature, and separating the magnesium hydroxide from the calcium carbonate.

11. The method of carbonating lime which comprises feeding powdered quicklime in the dry condition into an agitated body of water while charging diluted carbon dioxide continuously and simultaneously thereinto, the water having in solution approximately 0.005 per cent by weight of an alkali metal base, regulating the introduction of the diluted carbon dioxide into said water suspension to such rate as to maintain the conductivity of said suspension above that at the isoelectric point at the temperature obtaining, and maintaining the temperature of said body of water during carbonation below the boiling point of water.

12. The method of separating magnesia from a calcium-magnesium carbonate-containing mineral that has been burned substantially completely to a mixture of calcium and magnesium oxides, which comprises pulverizing said oxides, feeding said pulverized oxides in dry condition directly into an agitated and carbonated body of water to form a suspension of said oxides therein, regulating the introduction of dilute carbon dioxide into said water suspension at such a rate as to maintain the conductivity of said suspension above that at the isoelectric point at the temperature obtaining, but within the unsaturated range with respect to the concentration of dissolved calcium hydroxide, maintaining the temperature of the water below the boiling point of water, and separating magnesia and magnesium hydroxide from the resulting calcium carbonate.

13. Process according to claim 12 wherein the mixture of oxides comprises a dolomitic quicklime.

14. Process according to claim 12 wherein the mixture of oxides comprises a dolomitic quicklime, and including the steps of continuously charging water, pulverized dolomitic quicklime and carbon dioxide into the body of water, and withdrawing a corresponding quantity of aqueous suspension of calcium carbonate and magnesium oxide and hydroxide.

WILLIAM J. BARRETT.

REFERENCES CITED

The following references are of record in the file of this patent:

UNITED STATES PATENTS

| Number | Name | Date |
|---|---|---|
| 1,266,339 | Statham | May 14, 1918 |
| 1,361,325 | Grunwald | Dec. 7, 1920 |
| 1,962,150 | Mohler et al. | June 12, 1934 |
| 2,081,112 | Statham et al. | May 18, 1937 |
| 2,182,096 | Roderick | Dec. 5, 1939 |
| 2,198,640 | Stump | Apr. 30, 1940 |
| 2,211,908 | O'Connor | Aug. 20, 1940 |
| 2,231,965 | Stump | Feb. 18, 1941 |
| 2,242,228 | Bradner | May 20, 1941 |
| 2,386,027 | Wing | Oct. 2, 1945 |

OTHER REFERENCES

Leek: "The American Story of Precipitated Chalk," (1933), pp. 14 and 15.

Mellor: "Comprehensive Treatise on Inorganic and Theoretical Chemistry," vol. III, 1923, pp. 817, 818.